United States Patent [19]

Mitsuyoshi

[11] Patent Number: 5,056,787
[45] Date of Patent: Oct. 15, 1991

[54] STEERING APPARATUS FOR GAME MACHINE

[75] Inventor: Ishida Mitsuyoshi, Tokyo, Japan
[73] Assignee: Taito Corporation, Tokyo, Japan
[21] Appl. No.: 499,445
[22] PCT Filed: Dec. 21, 1988
[86] PCT No.: PCT/JP88/01290
    § 371 Date: Jul. 16, 1990
    § 102(e) Date: Jul. 16, 1990
[87] PCT Pub. No.: WO90/04440
    PCT Pub. Date: Mar. 5, 1990

[30] Foreign Application Priority Data

Oct. 25, 1988 [JP] Japan ................... 63-267166

[51] Int. Cl.$^5$ ............... A63F 9/22; G09B 9/04
[52] U.S. Cl. ................... 273/148 B; 434/62
[58] Field of Search ........... 273/148 B, 85 R, 85 G, 273/86 R, 86 H; 434/29, 62, 373; 446/454, 230

[56] References Cited

U.S. PATENT DOCUMENTS 3,479,750 11/1969 Swanson ................... 434/62
4,276,030 6/1981 Radice ................... 434/62

FOREIGN PATENT DOCUMENTS 51-32507 8/1976 Japan .
58-16637 6/1983 Japan .

Primary Examiner—Edward M. Coven
Assistant Examiner—Raleigh W. Chiu
Attorney, Agent, or Firm—Ladas & Parry

[57] ABSTRACT

A steering apparatus for a game machine according to the invention has a mechanism in which a steering wheel is rotated in accordance with the steering operation of the player and is automatically returned to the center. An end cam which always receives the elastic force of a compression coil spring sets the steering wheel to the neutral position, namely, the center by way of a guide roller. For instance, when the player operates the steering wheel to the right rotational direction, the guide roller rotates to the right together with the steering shaft. Thus, the end cam moves along the axial direction of the steering shaft in accordance with a rotational angle of the steering wheel. Then, when the steering wheel is released, the end cam receives the elastic force of the compression coil spring and allows the steering wheel to be returned to the center by way of the guide roller without performing the reversing operation of the steering wheel.

In the apparatus of the invention, a detector of the rotational angle and rotational direction of the steering shaft is provided and an automobile displayed on the display is operated.

2 Claims, 5 Drawing Sheets

STEERING APPARATUS FOR GAME MACHINE

TECHNICAL FIELD

The present invention relates to a steering apparatus for a game machine and, more particularly, to the improvement of a steering apparatus for a machine such as video game machine, simulator, or the like for an operator to subject to a simulation of the operation of an automobile.

BACKGROUND ART

Hitherto, a steering apparatus for a machine such as video game machine, simulator, or the like for an operator to subject to a simulation of the operation of an automobile has widely been known.

In such a kind or steering apparatus for the game machine, although a steering wheel can be freely rotated to the right and left, any special device to automatically return to the center has not been made. Therefore, it is difficult to execute the steering operation for accurately moving the automobile displayed on the display screen and the game cannot be sufficiently enjoyed.

The inventor of the present invention has already proposed a steering apparatus which can automatically return the steering wheel to the center (Japanese Patent Application No. 63-249135).

In the steering apparatus for a game machine which has already been proposed by the inventor of the present invention, torsion coil springs for rotating to the right and left are attached to a steering shaft, the steering wheel may be automatically returned to the center from the positions rotated to the right or left directions of the steering operation by the reactions of the torsion coil springs. Stoppers are provided at the end points of the movement in the right and left rotational directions of the steering wheel. That is, a rod member attached perpendicularly to the midway of the steering shaft rotates together with the steering shaft and comes into abutment with a stopper rubber on the base side, thereby stopping the rotation of the steering wheel.

In the above well-known apparatus, gears are used for acceleration from the steering shaft of an input shaft of an apparatus to detect a rotational angle and a rotational direction.

In the above steering apparatus for the game machine, since two torsion coil springs are used to return the steering wheel to the center, there is a problem such that a structure is complicated and the assembly and adjustment are difficult.

On the other hand, since the gear mechanism is used to accelerate the apparatus for detecting the rotational angle and rotational direction, the costs are high.

Further, before the above steering apparatus is attached to a frame, it is divided into three assemblies, so that they cannot be easily attached to the game machine.

DISCLOSURE OF THE INVENTION

The present invention was made in order to solve the above problems and it is an object of the invention to provide a steering apparatus for a game machine in which the apparatus has an automatic center return mechanism which can be reliably and safely operated by a simple mechanism and the apparatus may be assembled as a single unit.

The above object is accomplished by a steering apparatus for a game machine comprising structural elements disclosed in the following items (a) to (j):
(a) a base plate which is attached to a frame of the game machine;
(b) a steering shaft which is attached with a steering wheel at one end thereof and is rotatably supported on said base plate;
(c) a bracket fixed to an intermediate portion of said steering shaft;
(d) a guide roller which is rotatably supported by the bracket so that a central axis of said guide roller crosses perpendicularly to the steering shaft;
(e) an end cam which has a cam face consisting of a pair of symmetrical helical surfaces which define one valley in a peripheral portion of one end face and is coaxially provided for the steering shaft and is movably provided in its axial direction so that the cam face comes into contact with the guide roller;
(f) a guide to block the rotation of the end cam and to allow the movement in only the axial direction;
(g) a coil spring for exerting an elastic force on the end cam so as to press the cam face of the end cam to the guide roller;
(h) a stopper comprising a turning pin provided for the steering wheel and a fixed pin provided on a turning track of the turning pin;
(i) a center detector for generating an output when the guide roller coincides with the valley of the cam face of the end cam; and
(j) a rotational angle detecting means for detecting a rotational angle of the steering shaft.

On the other hand, the object of the invention may be also accomplished by a modified embodiment in which the positions of the bracket and guide roller and the position of the end cam were exchanged.

With the above structure, according to the first embodiment, the end cam which is exerted by the elastic force of the compression coil spring in the ordinary state may position the steering wheel to the neutral position, that is, the center by way of the guide roller. For instance, when the player operates the steering wheel in the right rotational direction, the guide roller rotates to the right together with the steering shaft. Thus, the end cam moves along the axial direction of the steering shaft in accordance with a rotational angle of the steering wheel.

Then, if the steering wheel is released, the end cam receives the elastic force of the compression coil spring to thereby return the steering wheel to the center by way of the guide roller without performing the reversing operation of the steering wheel.

On the other hand, in the apparatus of the present invention, the detectors for detecting the rotational angle and rotational direction of the steering shaft are provided and the automobile displayed on the display screen may by operated.

According to the second embodiment, the guide roller which receives the elastic force of the compression coil spring in the ordinary state may position the steering wheel to the neutral position, that is, the center by way of the end cam, so that the object similar to the first embodiment may be accomplished.

BRIEF DESCRIPTION OF THE DRAWINGS

FIG. 8 is a cross sectional view of a center return mechanism section and a stopper section shown in FIG. 5.

BEST MODE FOR CARRYING OUT THE INVENTION

Figure 1:
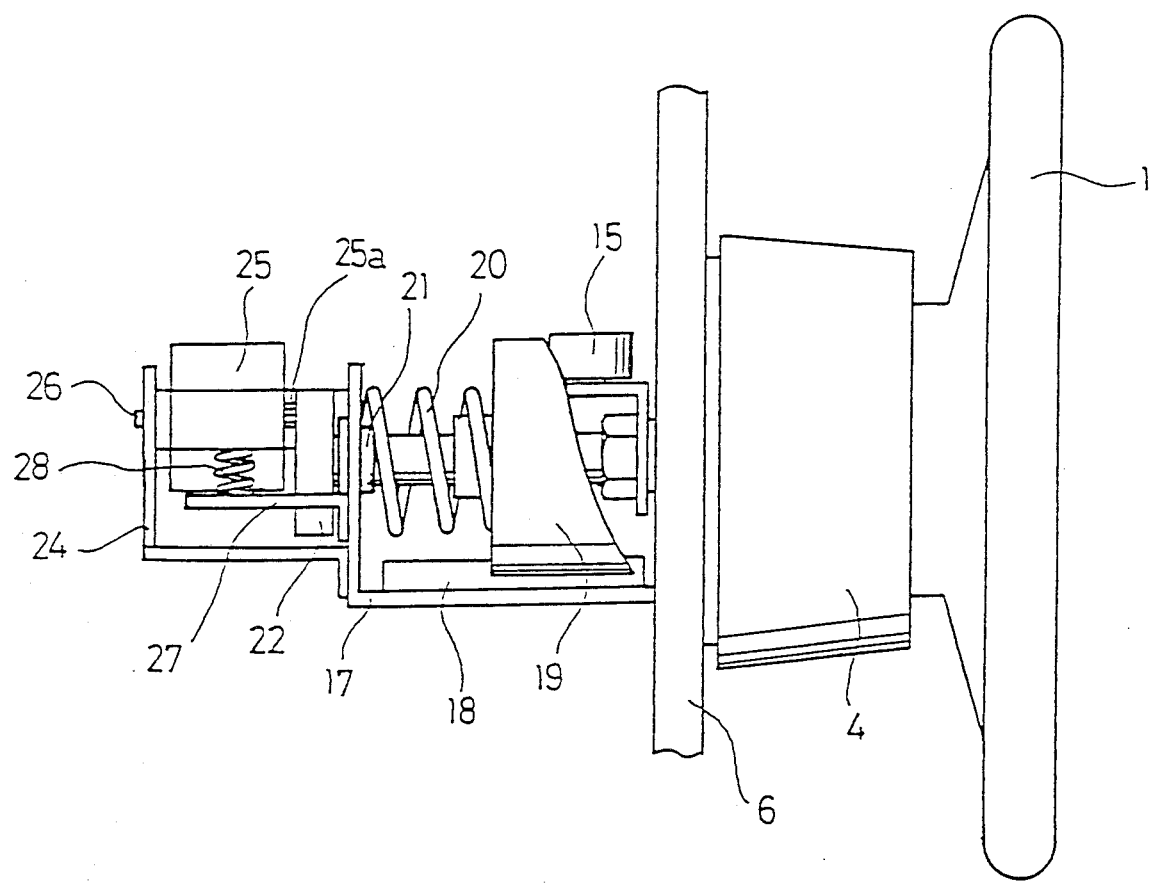
FIG. 1 is a side elevational view showing an embodiment of a steering apparatus for a game machine according to the present invention.

A construction of the invention will be explained in more detail hereinbelow with reference to the drawings.

In FIGS. 1 to 4, reference numeral 1 denotes a steering wheel; 2 a turning pin for a stopper; 3 a bearing; 4 a cover; 5 a fixed pin for a stopper; 6 a control panel of a game machine (not shown); 7 a base plate attached to the control panel 6; 8 a steering shaft attached to the steering wheel 1; 9 and 10 collars; 11 a photo sensor for detecting that the steering wheel 1 is located at the center; 12 a light shielding plate; 13 a bracket. 14 a nut; 15 a guide roller; 16 a nut; 17 a bracket; 18 a guide; 19 an end cam; 20 a compression coil spring; 21 a bush; 22 an accelerating cylinder provided at one end of the steering shaft 8; 23 a friction rubber provided on the inside of the accelerating cylinder 22; 24 a bracket; 25 a rotation detector having an input rotary shaft 25a provided so as to come into contact with the friction rubber 23; 26 a shaft for supporting the rotation detector 25 at one end of its outer frame so as to freely swing; 27 a bracket; and 28 a compression spring provided between the bracket 27 and the free end of the outer frame of the rotation detector 25, respectively.

The steering shaft 8 is attached with the steering wheel 1 at one end thereof.

The bearing 3 is attached onto the steering wheel side of the base plate 7 through the bracket. The bracket 17 is attached to the opposite side of the base plate 7. The steering shaft 8 is rotatably supported by those parts. The base plate 7 is attached to the control panel 6 of the game machine (not shown).

In order to construct stoppers for defining the end points of the rotations to the right and left of the steering wheel 1, the turning pin 2 is provided on the end face of the steering wheel 1. Further, the fixed pin 5 exists on the turning track of the turning pin 2 and the cover 4 covers those components.

The steering screw 8 is provided with a screw in the intermediate portion thereof. The collars 9 and 10 are fitted to the side of a large diameter of the steering shaft 8. An inner race of the bearing 3 is sandwiched by both of the collar 9 and 10. On the other hand, the light shielding plate 12 and bracket 13 for detecting the center are fixed to the end portion of the collar 10 by the nut 14.

The guide roller 15 is attached to one end of the bracket 13 by the nut 16.

When the steering 1 is located at the center, the light shielding plate 12 allows the photo sensor 11 provided on the base plate 7 to generate an output signal.

The end cam 19 is almost cylindrical and has a cam face consisting of a pair of symmetrical helical surfaces which form one valley on the periphery of the end face on the side which is come into contact with the guide roller 15. A spline groove is formed on the side surface of the end cam 19 in parallel with the center shaft. The spline groove is come into engagement with the guide 18 to block the rotation of the end cam 19.

The end cam 19 is always pressed to the guide roller 15 by the compression coil spring 20 provided between the cam 19 and the bracket 17. Therefore, when no external force is exerted on the steering wheel 1, the guide roller 15 remains dropped into the valley of the cam face of the end cam 19, so that the steering wheel 1 is held at the neutral position, that is, the center.

The accelerating cylinder 22 is coaxially provided at the tip of the steering shaft 8. The friction rubber 23 is adhered onto the inner surface of the cylinder.

One end of the outer frame of the rotation detector 25 is pivotally supported between the brackets 24 and 17 by the shaft 26. The other end of the outer frame is pushed up by the compression spring 28 attached to the bracket 27, so that the input rotary shaft 25a is come into abutment with the friction rubber 23 and is rotated.

The rotation detector 25 detects right and left rotational angles of the steering wheel by the rotation of the input rotary shaft 25a.

In the steering apparatus for the game machine according to the invention, the guide roller 15 is always located at the center of the end cam 19 by the compression coil spring 20. For instance, when the player operates the steering wheel 1 in the right rotational direction, the guide roller 15 is rotated to the right around the center shaft of the steering shaft 8 together with the steering shaft 8 and pushes the cam face of the end cam 19 to the left in FIG. 1. Thus, the end cam 19 is moved to the left in FIG. 1 along the axial direction of the steering shaft 8 in accordance with the rotational angle. Next, when the player releases the steering wheel 1, the end cam 19 receives the elastic force of the compression coil spring 20 to thereby move the guide roller 5 to the position of the valley, namely, the center position of the end cam 19. Thus, the steering wheel 1 may be automatically returned to the center.

On the other hand, the rotation detector 25 detects the rotational angle and rotational direction of the steering shaft 8 ans sends its output to a CPU (not shown) and controls the position of the automobile displayed on the display screen.

Figure 5:
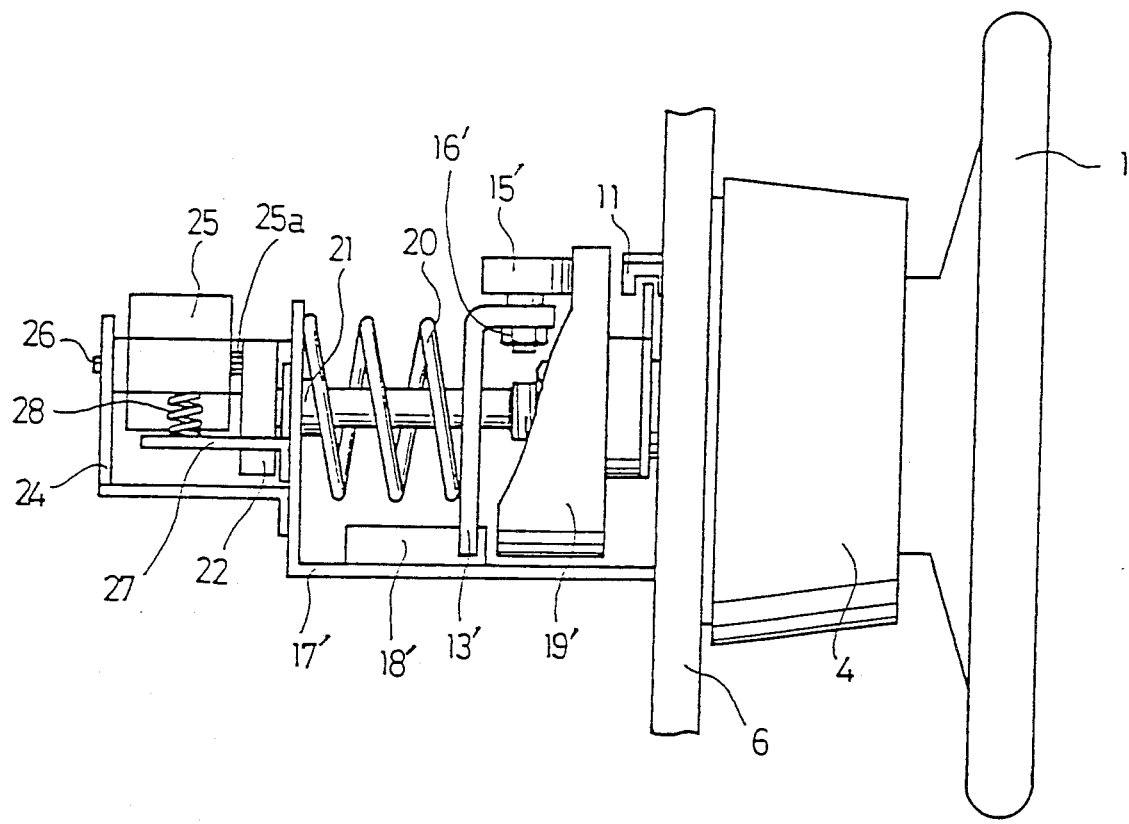
FIG. 5 is a side elevational view showing another embodiment of a steering apparatus for a game machine according to the invention.
Figure 6:
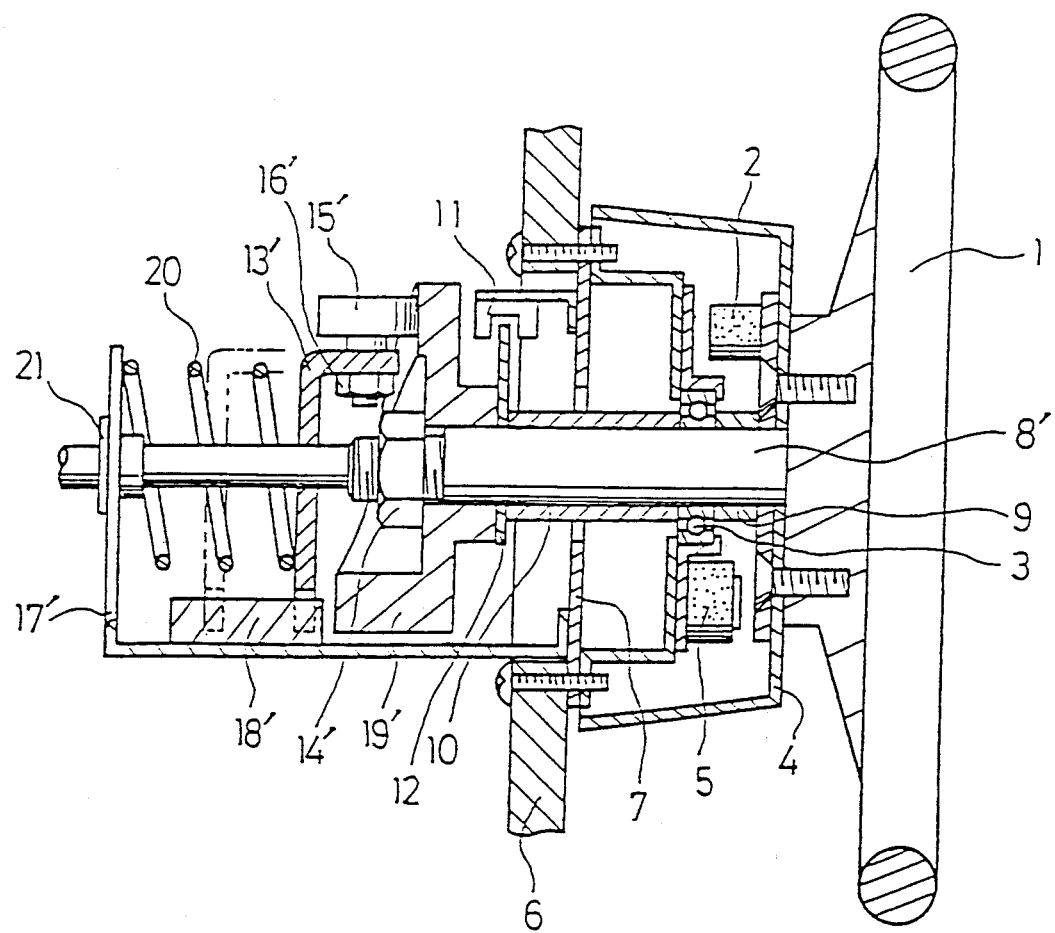

FIG. 5 is a side elevational view showing another embodiment of a steering apparatus for a game machine according to the invention. FIG. 6 is a cross sectional view of a part of a center return mechanism section and a stopper section shown in FIG. 5.

In FIGS. 5 and 6, reference numeral 1 denotes the steering wheel; a the movable pin for the stopper; 3 the bearing; 4 the cover; 5 the fixed pin for the stopper; 6 the control panel of the game machine (not shown); 7 the base plate attached to the control panel 6; 8' a steering shaft attached to the steering wheel 1; 9 and 10 the collars; 11 the photo sensor for detecting that the steering wheel 1 is located at the center; 12 the light shielding plate; 13' a bracket; 14' a nut; 15' a guide roller; 16' a nut 17' a bracket; 18' a guide; 19' an end cam; 20 the compression coil spring; 21 the bush; 22 the accelerating cylinder provided at one end of the steering shaft 8'; 23 the friction rubber provided on the inside of the accelerating cylinder 22; 24 the bracket; 25 the rotation detector having the input rotary shaft 25a which is provided so as to come into contact with the friction rubber 23; 26 the shaft to support the rotation detector 25 at one end of the outer frame so as to freely swing; 27 the bracket; and 28 the compression spring provided between the bracket 27 and the free end of the outer frame of the rotation detector 25.

Figure 2:
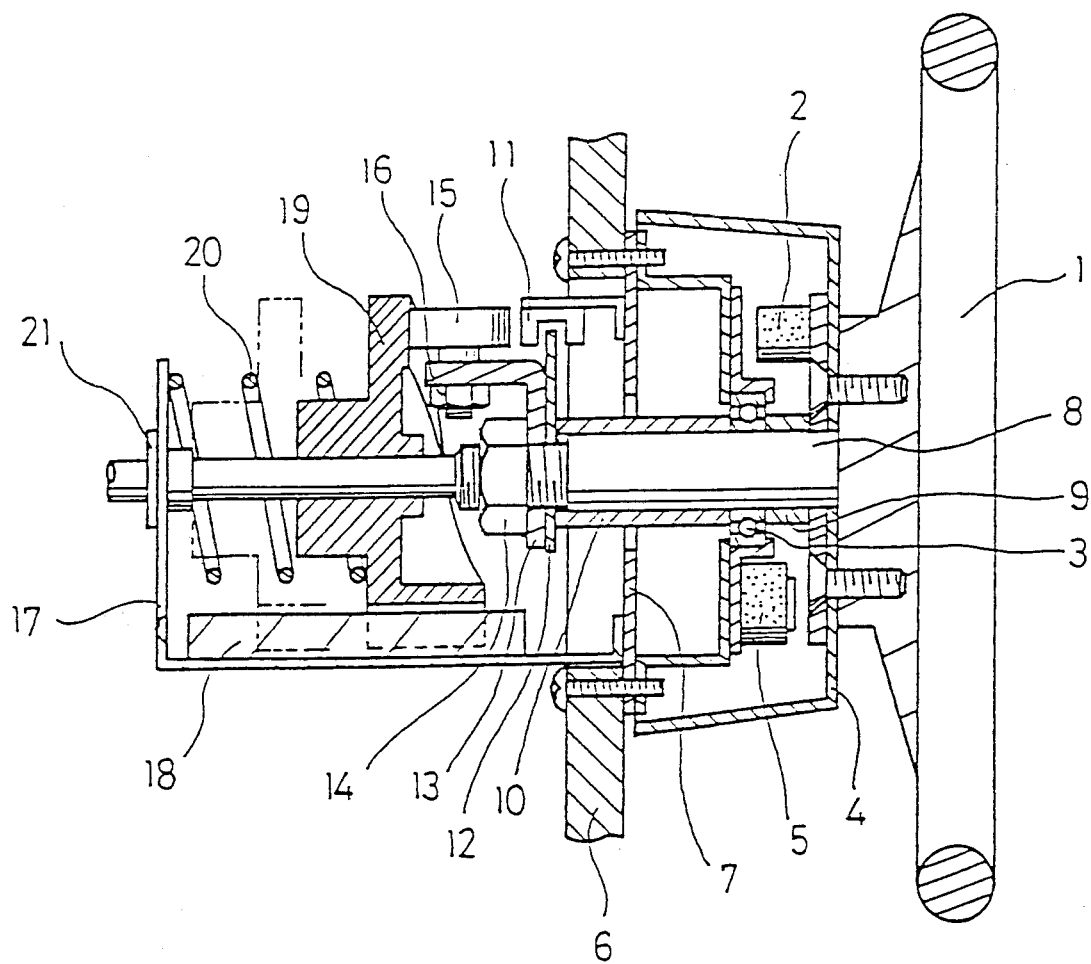
FIG. 2 is a partial cross sectional view of a center return mechanism and a stopper shown in FIG. 1.
Figure 3:
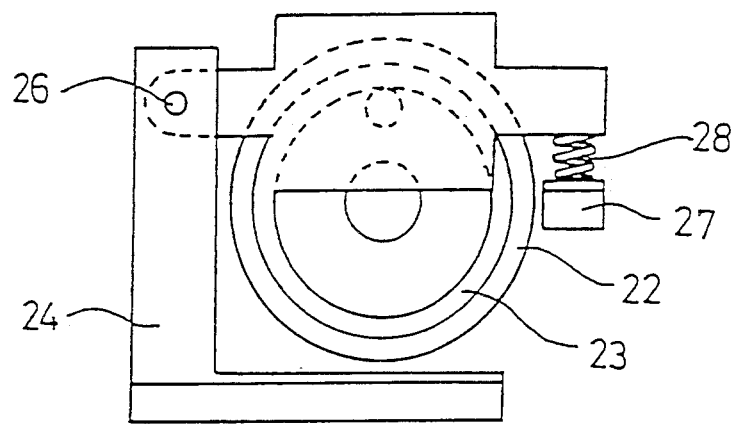
FIGS. 3 and 4 are a back view and a side elevational view with a part cut away of a detecting section for detecting a rotational angle and a rotational direction shown in FIG. 1, respectively.
Figure 4:
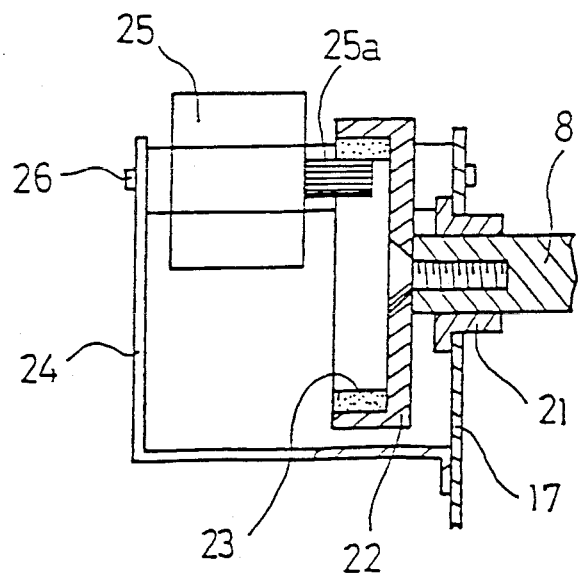

According to this embodiment, the positions of the bracket 13 and guide roller 15 and the position of the end cam 19 in the first embodiment shown in FIGS. 1 and 2 are exchanged. The end cam is fixed to the steering shaft. The guide roller and its bracket are set to be movable in the direction of the center shaft of the steering shaft, thereby automatically returning the steering wheel.

The end cam 19' is similar to that of the first embodiment. A cam face consisting of a pair of symmetrical helical surfaces defining one valley is formed on the periphery of the end face on the side of the end cam 19' which is come into contact with the guide roller 15'.

The bracket 13' is slidably supported on the small diameter side of the steering shaft 8'. The guide roller 15' is attached to one end of the bracket 13' by the nut 16'. A notched groove is formed at the other end. The notched groove is come into engagement with the guide 18' to block the rotation of the bracket 13'.

The guide roller 15' is always pressed to the cam face of the end cam 19' by the compression coil spring 20 provided between the brackets 13' and 17'. Therefore, when no external force is exerted on the steering wheel 1, since the steering shaft 8' is held so that the valley of the cam face of the end cam 19' coincides with the guide roller 15', the steering wheel 1 may be held at the neutral position, that is, the center.

The operations of the other portions are similar to those in the first embodiment.

Since the present invention is constructed as mentioned above, according to the invention, it is possible to provide a miniaturized steering apparatus for a game machine in which the steering wheel may be automatically returned to the center by a simple mechanism.

The invention is not limited to the above embodiments but includes all of the variations and modifications which can be easily thought by the person with an ordinary skill in the art from the above description within the scope of the objects of the invention.

The scope of the invention, therefore, must be limited on the basis of only the scope of Claims shown hereinlater.

INDUSTRIAL APPLICABILITY

A steering apparatus for a game machine according to the invention is used for a game machine which is mainly installed in a game center or a recreation field.

I claim:

1. A steering apparatus for a game machine comprising:
   (a) a base plate (7) which is attached to a frame (6) of the game machine;
   (b) a steering shaft (8) which is attached with a steering wheel (1) at one end thereof and is rotatably supported on said base plate (7);
   (c) a bracket (13) fixed to an intermediate portion of said steering shaft (8);
   (d) a guide roller (15) which is rotatably supported by the bracket (13) so that a central axis of said guide roller crosses perpendicularly to the steering shaft (8);
   (e) an end cam (19) which has a cam face consisting of a pair of symmetrical helical surface which define one valley in a peripheral portion of one end face and is coaxially provided for the steering shaft (8) and is movably provided in its axial direction so that the cam face comes into contact with the guide roller (15);
   (f) a guide to block the rotation of the end cam (19) and to allow the movement in only the axial direction;
   (g) a coil spring (20) for exerting an elastic force on the end cam (19) so as to press the cam face of the end cam (19) to the guide roller (15);
   (h) a stopper comprising a turning pin (2) provided for the steering wheel (1) and a fixed pin (5) provided on a turning track of the turning pin (2);
   (i) a center detector (11) for generating an output when the guide roller (15) coincides with the valley of the cam face of the end cam (19); and
   (j) a rotational angle detecting means (25) for detecting a rotational angle of the steering shaft (8).

2. A steering apparatus for a game machine comprising:
   (a) a base plate (7) which is attached to a frame (6) of the game machine;
   (b) a steering shaft (8') which is attached with a steering wheel (1) at one end thereof and is rotatably supported on the base plate (7);
   (c) an end cam (19) which has a cam face consisting of a pair of symmetrical helical surfaces which define one valley in a peripheral portion of one end face and is coaxially fixed to an intermediate portion of the steering shaft (8');
   (d) a bracket (13') which is slidably provided in the intermediate portion of the steering shaft (8');
   (e) a guide roller (15') which is supported by the bracket (13') so that a central axis of said guide roller (15') crosses perpendicularly to the steering shaft (8') and an outer peripheral surface comes into contact with the cam face of the end cam (19') and rolls;
   (f) a guide (18') to block the rotation of the bracket (13') around the steering shaft (8') and to allow the movement in only the axial direction;
   (g) a coil spring (20) for exerting an elastic force on the end cam (19') so as to press the cam face of the end cam (19') to the guide roller (15');
   (h) a stopper comprising a turning pin (2) provided for the steering wheel (1) and a fixed pin (5) provided on a turning track of the turning pin (2);
   (i) a center detector (11) for generating an output when the guide roller (15') coincides with the valley of the cam face of the end cam (19'); and
   (j) a rotational angle detecting means (25) for detecting a rotational angle of the steering shaft (8').

* * * * *